2 Sheets—Sheet 1.
G. LEVERICH.
WHEELS FOR VEHICLES.
Reissued March 7, 1876.
No. 6,983.
Fig: 1.
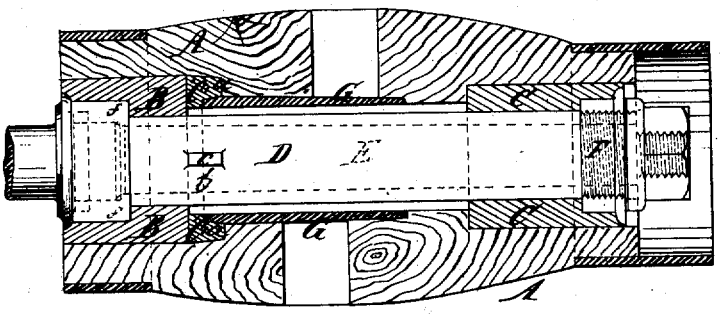
Fig: 2.
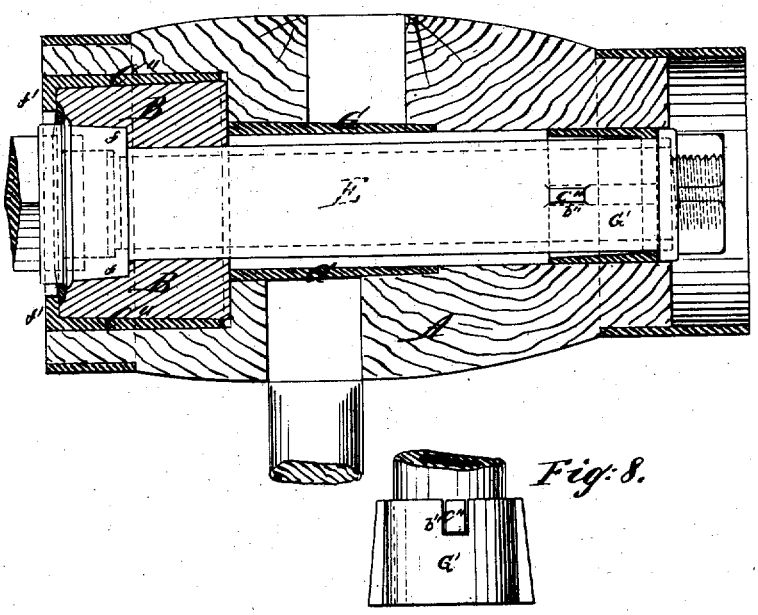
Fig: 8.
Witnesses:
Ernst Bilhuber
H. Wells Jr.
Inventor
Gabriel Leverich
per James A. Whitney
Atty.

2 Sheets—Sheet 2.

G. LEVERICH.

WHEELS FOR VEHICLES.

No. 6,983. Reissued March 7, 1876.

Witnesses:

Ernst Bilhuber

H. Wells Jr

Inventor

Gabriel Leverich per James A Whitney

Atty.

UNITED STATES PATENT OFFICE.

GABRIEL LEVERICH, OF BROOKLYN, ASSIGNOR TO JOHN B. SAMMIS, OF NEW YORK, N. Y.

IMPROVEMENT IN WHEELS FOR VEHICLES.

Specification forming part of Letters Patent No. 159,940, dated February 16, 1875; reissue No. 6,983, dated March 7, 1876; application filed December 17, 1875.

*To all whom it may concern:*

Be it known that I, GABRIEL LEVERICH, of Brooklyn, in the county of Kings and State of New York, have invented certain Improvements in Elastic Hubs, &c., of which the following is a specification:

This invention relates to that class of hubs for carriage and other wheels in which the box or bearing for the skein or axle is cushioned at one or both ends with india-rubber or other elastic substance in order to diminish the strain and concussion upon the skein or axle incident in the ordinary use or operation of the wheel.

The invention comprises a novel combination, with the wheel-hub, the elastic cushions, and the box or bearing, of a recessed or slotted ring and a radial spur extending therein from the aforesaid box or bearing, whereby the requisite rotation of the latter with the hub, without interference with the operation of the elastic cushions, is provided for.

The invention further consists in a novel combination, with the wheel-hub, the elastic cushions, and the box or bearing, of an internal sleeve, arranged around, but at some distance from, the box or bearing aforesaid, in order to permit the requisite play of the latter, and covering the inner end of the spoke-mortises of the hub, whereby compensation is made for the weakening of the hub incident to the hollowing out thereof to provide for the reception and operation of the cushioned box or bearing, and whereby at the same time the inward projection of the spokes to interfere with the movement of the box or bearing incident to the yielding of the cushions during the use of the wheels is prevented.

The invention further comprises a shell constructed with a retaining flange, in combination with the wheel-hub and with the elastic cushions, whereby provision is made for the most secure and permanent retention of the aforesaid cushions in proper position with the hub.

The invention further comprises a novel combination of a radial spur on the box or bearing, with a recess provided in a sleeve inserted in the bore of the hub, whereby the turning of the box or bearing within the hub is effectually prevented.

Figure 3:
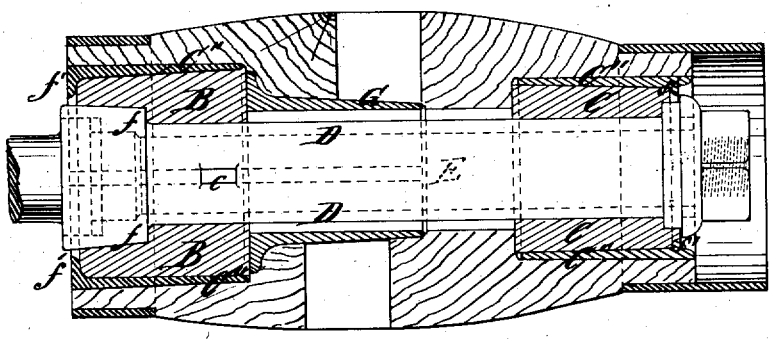
Figure 4:
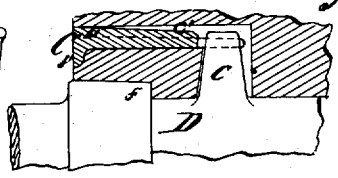
Figures 5, 6:
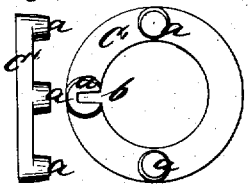

Figures 1, 2, and 3 are central longitudinal sectional views of hubs embracing different modifications of my inventions. Fig. 4 is a detached sectional view on a larger scale of one portion of the invention, as shown in Fig. 3, taken in a plane at right angles to the latter; and Figs. 5, 6, 7, and 8 are detached views of separate parts of the apparatus.

Having reference to Fig. 1, A is the hub, counterbored at each end to receive the elastic cushions B C. Between the cushion B, at the inner end of the hub, and the inner end of its counterbore is a ring, C′, formed with spurs *a* that fit into recesses formed in the wood of the hub, and thereby prevent the ring C′ from turning within the latter. This ring has a notch or slot, *b*, formed in its edge. Into this slot projects a radial spur, *c*, provided on the outer surface of the box or bearing D. This is what is commonly termed a pipe-box, and extends through the bore of the hub from end to end, the said hub being chambered or enlarged to provide for the requisite movement of the box D in all directions. The journal or skein E of the axle passes through the box in the usual manner.

The box at its inner end is constructed with one or more circumferential shoulders *f*, bedded in rabbets of corresponding shape provided in the elastic cushion B. At the opposite end the box has an external screw-thread, upon which is screwed the nut F, which is bedded in suitably-shaped rabbets in the end of the adjacent cushion C. By turning this nut inward the cushions are compressed to any degree desired, and their tension may be regulated at will to relieve the box, and consequently the journal or skein within it, from longitudinal strain and concussion that would otherwise be brought thereon by the lateral jarring of the wheel when in use. The cushions, being elastic, of course yield under the downward pressure of the skein, while the same is rotated with the movement of the hub by the holding of the radial spur *c* in the recess $b$ of the ring C′, which, as hereinbefore explained, is firmly attached to the hub itself. This connection of the box with the hub permitting the movement of the former radially from the axis of the latter, the perfect operation of the cushions in preventing vertical jar-ring of the box, and, consequently, that of the journal and the parts supported thereby, is provided against.

When preferred, the cushions may be entirely surrounded by shells, as represented by C″ in Figs. 2, 3, in which case the attachment of one shell to the hub is provided for by radial ribs $c'$ on the rear shell, fitted into corresponding recesses provided in the receiving or counterbored adjacent portion of the hub, as in Fig. 4, where it is shown more in detail. In some cases—as, for example, when the hub is to be used for wheels of heavy vehicles—the inner end only of the hub may be cushioned, in which case the sleeve and spur may be arranged at that end of the hub devoid of a cushion, as shown in Figs. 2 and 8. It will be noticed that, as represented in Figs. 1 and 7, the spur $c$ also projects into a slot or notch, $b'$, provided in the ring or sleeve G, the latter also holding the box D against rotation within the hub.

Inasmuch as the bore of the hub must be of sufficient diameter to permit the herein-before-described radial movement of the box, the hub itself would be much weakened if no means were provided to compensate for the wood removed. Moreover, if the spoke-mortises were left open at their inner ends, the driving in of the spokes would, in many cases, cause them to project inward so far as to prevent the proper working of the box. In order to obviate both of these drawbacks, an internal metallic sleeve, as G, of sufficient internal diameter to permit the play of the box D within it, is driven into the central or chambered portion of the hub, thus providing a cylindrical brace within the hub, and closing the inner ends of the spoke-sockets to prevent the inward thrust of the spokes to an extent capable of interfering with the operation of the box D, cushioned as set forth.

Figure 7:
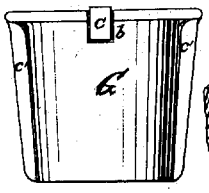

This sleeve G may either be made separate from the ring C′, as shown in Fig. 7, or it may be formed in one therewith, when preferred, as shown in Figs. 3 and 7.

What I claim as my invention is—

1. The recessed or slotted ring C′, and the radial spur $c$ of the box or bearing D, in combination with the hub A and a cushion or cushions, the whole to operate substantially as and for the purpose set forth.

2. In an elastic hub, the internal sleeve G, and combined to permit radial play of the box or bearing D with the said bearing and one or more elastic cushions B C, the said sleeve to close the inner end of the spoke-mortises, substantially as and for the purpose set forth.

3. The shells C″, constructed with the retaining-flanges $f'$, in combination with the hub A and its elastic cushions B C, substantially as and for the purpose set forth.

4. The radial spur $c''$ on the box D, in combination with a recess, $b''$, provided to the sleeve G′, the whole arranged substantially as shown in Figs. 2 and 8, as and for the purpose set forth.

5. The radial spur $c$ on the box D, in combination with a recess $b$ in the sleeve G, the whole arranged substantially as shown in Figs. 1 and 7, for the purpose set forth.

6. The elastic hub, comprising the box or bearing D, with one or more circumferential shoulders $f$, provided with the nut F at its outer end, and having the radial spur $c$, one or more elastic cushions B C, the ring C′, and the sleeve G, to permit the radial play of the box D, all combined for operation substantially as and for the purpose set forth.

GABRIEL LEVERICH.

Witnesses:
ERNEST G. SCHURIG,
GEO. W. HAYES.